United States Patent Office 3,271,395
Patented Sept. 6, 1966

3,271,395
MELAMINE PRODUCTION
Kenzie Nozaki, El Cerrito, Calif., assignor to Shell Oil
Company, New York, N.Y., a corporation of Delaware
No Drawing. Filed Feb. 17, 1964, Ser. No. 345,110
4 Claims. (Cl. 260—249.7)

This invention relates to a process for the preparation of melamine. More particularly the invention relates to a method for preparing melamine from urea, ammonia and sulfur trioxide.

Melamine has been prepared by a number of methods, one of which is the conversion of urea in the presence of ammonia at 350–500° C. and 3000–4500 p.s.i.g. In another known process dicyandiamide is used to prepare melamine. The reaction involves several steps at high temperatures and pressures.

A major disadvantage of the processes heretofore used in the production of melamine has been the production of a number of undesirable side products. Such undesirable materials obtained in substantial quantities include ammeline, guanidine sulfate, guanidine, cyanuric acid, carbon dioxide, ammelide, and dicyandiamide. A method for preparing melamine in very high yields whereby the production of these undesirable materials is avoided has been disclosed by applicant in U.S. Patent No. 3,106,556, issued October 8, 1963. In that patent is described a process whereby a derivative of sulfamic acid and a carbamide are reacted at moderately elevated temperatures and pressures to produce melamine. The sulfamic acid derivatives are more fully set forth therein. However, a disadvantage to such a process is that the sulfamic acid starting materials must be carefully prepared from raw materials by processes involving several steps which in most instances requires elevated temperatures and pressures thereby requiring additional equipment and cost. The disadvantages of having to produce or otherwise commercially obtain the necessary starting materials to be used in the melamine process as disclosed in the patent are obvious.

It is a primary object of this invention to provide an improved process for the preparation of melamine. It is another object of this invention to provide a process which obviates the necessity of separately preparing starting materials to be reacted with urea to produce melamine. It is a further object of the invention to provide a process for preparing melamine in which essentially only one reaction step is necessary utilizing inexpensive raw materials. These objects will be better understood and others will become apparent from the description of the invention as disclosed herein.

Now, in accordance with the present invention, an improved process has been provided whereby sulfur trioxide, a carbamide and ammonia are reacted together to produce melamine. Thus, this invention provides a process for the direct reaction of inexpensive and readily obtainable raw materials to prepare melamine.

The process may take place in any suitable reaction vessel, preferably one suitable for both gaseous and liquid materials which may be reacted under pressure. On a laboratory scale an autoclave may be used. The reactor used in the process may be composed of materials such as stainless steel, glass, ceramic material, or brick. Either a glass or brick-lined reactor may be advantageously employed. Glass-lined or glass reactors may be used in the instant process because of the low pressures employed. A brick or ceramic lined vessel has the advantage of being relatively cheaper and generally allows for a more uniform distribution of heat throughout the reaction. However, glass-lined reactors are preferred. The reaction vessel should have means for allowing efficient entry of reactants into the reaction zone. The vessel may also be equipped with a means for heating and/or cooling the reaction zone and materials therein to the desired temperature.

The carbamide reactant employed in the process of the present invention may be urea or an N,N'-hydrocarbon-substituted carbamide of the formula:

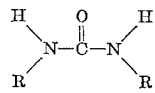

wherein each R is independently selected from the group consisting of hydrogen, aryl hydrocarbon groups of from 6 to 10 carbon atoms, and a lower alkyl group (1–4 carbon atoms). Examples comprise urea, n-butyl urea, sec-butyl urea, tert-butyl urea, N,N'-dimethyl urea, N,N'-diethyl urea, N,N'-diphenyl urea, N-methyl-N'-ethyl urea, etc. When the substituted ureas are used the corresponding substituted melamine is produced. However urea is preferred and best yields are obtained therewith.

The ammonia, sulfur trioxide and the carbamide reactants may be added to the reaction zone in any order desired and may be in any convenient or available physical state which will of course depend on the temperature. Thus, for example, ammonia and sulfur trioxide may be mixed as gases at elevated temperatures (100°–300° C.) or as liquids or even solids at lower temperatures as low as for example −200° C. followed by the addition of solid or liquid urea to the mixtures. Alternatively powdered urea and liquid sulfur trioxide may be mixed with or without a solvent to which mixture ammonia is added. If liquid ammonia is available it may be mixed with solid sulfur trioxide to which mixture urea may be added.

Generally the reaction temperature can be from about 0° C. to about 450° C. with the range of about 200° C. to 400° C. being preferred and particularly temperatures from about 250° to about 350° C. The reaction will proceed more rapidly as the temperature and/or pressure within the reaction zone is increased. The reaction is exothermic so to a certain degree supplies its own heat. However, where the temperature rises above that desired, cooling of the reaction vessel may be necessary. An especially convenient method of controlling the temperature within the reaction zone is by allowing excess ammonia fed into the reaction to be released during the reaction by providing a means for its removal from the reaction zone through a valve. In this manner the reaction zone pressure of ammonia is also regulated. The ammonia released may be cooled and recycled to the reaction vessel.

Pressures within the reaction zone may be atmospheric or superatmospheric. Since ammonia is normally in gaseous form at reaction temperatures, in order to have an appreciable amount of ammonia present it is necessary to have it under pressure above about 50 p.s.i.g. The preferred range is from about 50 p.s.i.g. to about 1000 p.s.i.g. and most preferably between about 200 p.s.i.g. and 650 p.s.i.g. of ammonia.

The relative proportions of the reactants in the process are not critical and may be varied to any extent since as long as some of the three reactants are present some melamine will be formed under proper conditions of temperature and pressure. However, the proportions may be selected to give optimum yields at certain temperatures and pressures. Preferably the mole ratio of urea:sulfur trioxide:ammonia of about 0.5–1.5:0.5–1.5:1.5–10 may be used, the stoichiometric mole ratios being 1:1:2, respectively. However it is generally desirable to use an excess of ammonia over the stoichiometric amount required for reaction with the urea and sulfur trioxide to insure complete reaction of the urea and sulfur trioxide and, accordingly, increase the yield of melamine.

The time required for the reaction may vary with temperature, pressure and uniformity of the reaction mixture. Generally, the reaction time will be between about one hour to about ten hours where the temperature is between about 250° to 350° C. and the ammonia pressure is between about 200 and 650 p.s.i.g. Longer reaction times may be necessary at lower temperatures and pressures.

Care should be taken to prevent moisture from entering the reaction system. The reactants should preferably be in an anhydrous or substantially anhydrous state. Sulfur trioxide is rapidly acted on by water to form sulfuric acid which is undesirable in the reaction mixture.

A solvent may be used to insure a more homogeneous reaction mixture especially where urea and sulfur trioxide are initially mixed in solid form. The solvent selected should be one which is inert to the reactants. In addition to being unreactive, the solvent should be fairly volatile so that it may easily be removed from the reaction mixture. Suitable solvents comprise ethers, amines, or nitro-containing compounds. Specific solvents which may be used comprise for example dioxane, trimethylamine, nitromethane and pyridine. These solvents are merely representative and there is no criticality in the solvent selected other than as set forth above.

The reaction product of the process of this invention is a mixture of ammonium sulfate and melamine. The melamine may be separated from the sulfate by conventional methods such as leaching the product mixture with water. The ammonium sulfate dissolves in water and the resulting solution is separated from the only slightly water-soluble melamine. The leaching operation may be conducted at room temperature with only a slight loss of melamine. The use of water at about 0° C. in an amount just sufficient to dissolve the ammonium sulfate minimizes the loss of melamine.

The following examples will illustrate the nature and advantages of the process of the invention. It should be understood, however, that the examples are merely illustrative and are not to be regarded as limitations to the invention, since the teachings thereof may be utilized with modifications as will be understood by one skilled in the art.

*Example I*

5.02 grams (.0838 mole) of powdered solid urea and 6.7 grams (.0838 mole) of liquid sulfur trioxide were placed in a sealed 20 ml. autoclave that was equipped with a magnetic stirrer. Stirring was initiated while the mixture was warmed from 0° C. to 65° C. Ammonia was added until a pressure of 500–650 p.s.i.g. was obtained. The mixture was then heated to 310° C. for about 10 hours. The reaction product was about 70% melamine.

*Example II*

5.02 grams (.0838 mole) of powdered solid urea was placed in a 20 ml. glass-lined pressure reactor cooled to −195° C. 5.1 grams (.300 mole) of ammonia was then added followed by 6.6 grams (.0835 mole) of sulfur trioxide. The reactor was closed and was heated to 310° C. in 1 hour and maintained at 310° C. for 10 hours. 85% yield of melamine was obtained.

*Example III*

6.7 grams (.0838 mole) of sulfur trioxide and 4.2 grams (.250 mole) of ammonia were added to a sealed reaction vessel. 5.02 grams (.0838 mole) of urea was then introduced into the reaction zone and ammonia was added to a pressure of 500 p.s.i.g. and a reaction temperature of 310° C. was maintained for approximately 10 hours, after which time the reaction product was removed. An 86.2% yield of melamine was obtained.

*Example IV*

20 grams (.333 mole) of urea and 26.7 grams (.333 mole) of sulfur trioxide were dissolved in 10.0 ml. of nitromethane solvent at room temperature (18–30° C.). The mixture was heated to 65° C. and the nitromethane was flashed off. The resulting mixture was pressured to 500 p.s.i.g. with ammonia and heated for 5 hours at 310° C. A reaction product containing 76% melamine was obtained.

*Example V*

Sulfur trioxide (6.7 grams) (.0838 mole) and 2.14 grams (.126 mole) of ammonia were mixed in a 20 ml. autoclave at −80° C. 5.02 grams (.0838 mole) of powdered urea was added and the mixture heated to 310° C. for approximately 5 hours. The ammonia pressure was held at 525 p.s.i.g. A yield of 82.5% melamine was obtained.

*Example VI*

8 grams (0.1 mole) of sulfur trioxide, 3.6 grams (0.21 mole) of ammonia and 6 grams (0.1 mole) of urea are added to a closed pressure vessel at 250° C. The heat of reaction raises the temperature above 250° C. The vessel is then maintained at about 300–320° C. for a period of 5 hours while the ammonia pressure is held at about 500–650 p.s.i.g. Melamine is recovered nearly quantatively as the reaction product.

I claim as my invention:

1. The process for preparing a melamine comprising reacting a mixture of sulfur trioxide, ammonia, and a carbamide of the formula

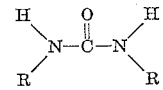

wherein the R's are independently selected from the group consisting of hydrogen, aryl of from 6–10 carbon atoms, and lower alkyl at a temperature from about 0° C. to about 450° C. and a pressure from about 50 p.s.i.g. to about 1000 p.s.i.g.

2. The process of claim 1 wherein the carbamide is urea.

3. The process of claim 2 wherein the molar proportions of urea: sulfur trioxide:ammonia are about 0.5–1.5:0.5–1.5:1.5–10, respectively.

4. The process for preparing melamine comprising reacting a mixture of sulfur trioxide, urea and ammonia at a temperature of from about 200° to about 400° C. at a pressure between about 200–650 p.s.i.g. wherein the respective molar proportions are about 0.5–1.5:0.5–1.5:1.5–10 and recovering the melamine from the resulting essentially elemental sulfur-free product mixture.

References Cited by the Examiner

UNITED STATES PATENTS

| | | | |
|---|---|---|---|
| 2,768,168 | 10/1956 | Robinson et al. | 260—249.7 |
| 2,824,104 | 2/1958 | Robinson et al | 260—249.7 |
| 2,902,488 | 9/1959 | Jackson et al. | 260—249.7 |
| 3,005,819 | 10/1961 | Jackson et al. | 260—249.7 |

WALTER A. MODANCE, *Primary Examiner.*

JOHN M. FORD, *Assistant Examiner.*